United States Patent [19]

Ayre

[11] 3,752,171

[45] Aug. 14, 1973

[54] FLUID GAIN CHANGE CIRCUIT

[75] Inventor: Vernon H. Ayre, Falkville, Ala.

[73] Assignee: The United States of America as represented by the Secretary of the Army, Washington, D.C.

[22] Filed: June 25, 1971

[21] Appl. No.: 156,784

[52] U.S. Cl. .......... 137/1, 137/819

[51] Int. Cl. .......... F15c 1/12

[58] Field of Search .......... 137/81.5, 1; 235/201

[56] References Cited

UNITED STATES PATENTS

| | | | |
|---|---|---|---|
| 3,556,121 | 1/1971 | Urbanosky | 137/81.5 |
| 3,610,261 | 10/1971 | Turek | 137/81.5 X |
| 3,515,159 | 6/1970 | Bermel | 137/81.5 |
| 3,626,473 | 12/1971 | Posingies | 137/81.5 |
| 3,568,702 | 3/1971 | Dustin | 137/81.5 |
| 3,587,609 | 6/1971 | DiCamillo | 137/81.5 |
| 3,587,616 | 6/1971 | Boothe | 137/81.5 |
| 3,631,874 | 1/1972 | Rexford | 137/81.5 |
| 3,661,163 | 5/1972 | Grant et al. | 137/81.5 |

*Primary Examiner*—Samuel Scott
*Attorney*—Harry M. Saragovitz, Edward J. Kelly et al.

[57] ABSTRACT

A fluidic gain change circuit is disclosed that produces a variable output pressure for providing an adjustable gain guidance and control circuit in response to gain changing signals. For a relatively fixed input signal at control ports, fluid amplifiers respond to a power jet change to couple discrete or digital change signals to a proportional output stage. This allows a differential fluidic output signal to increase or decrease by discrete steps of fluid flow levels.

6 Claims, 2 Drawing Figures

Vernon H. Ayre,
INVENTOR.
BY Harry M. Saragovitz
Edward J. Kelly
Herbert Berl
Jack W. Voigt

FLUID GAIN CHANGE CIRCUIT

SUMMARY OF THE INVENTION

A digital gain changing fluidic circuit is disclosed wherein the gain of an analog circuit is changed in discrete increments on command from time-sequenced or event-sequenced sources. An input signal is divided into as many parts as the desired number of increments or output levels that are required. In each increment the gain is commanded to either zero or one. The incremental signals are then summed to produce the desired gain, which is a function of the initial analog input signal.

An object of the present invention is to provide a digital gain change circuit for splitting an analog input signal into a desired number of increments.

Another object of the present invention is to provide a fluidic gain change circuit for providing separately amplified incremental signals that can be commanded to either zero or one and selectively summing the increments to provide a variable differential output signal.

A further object of the present invention is to provide a method for changing gain digitally to provide a proportional output signal.

DESCRIPTION OF THE PREFERRED EMBODIMENT

Figure 1:
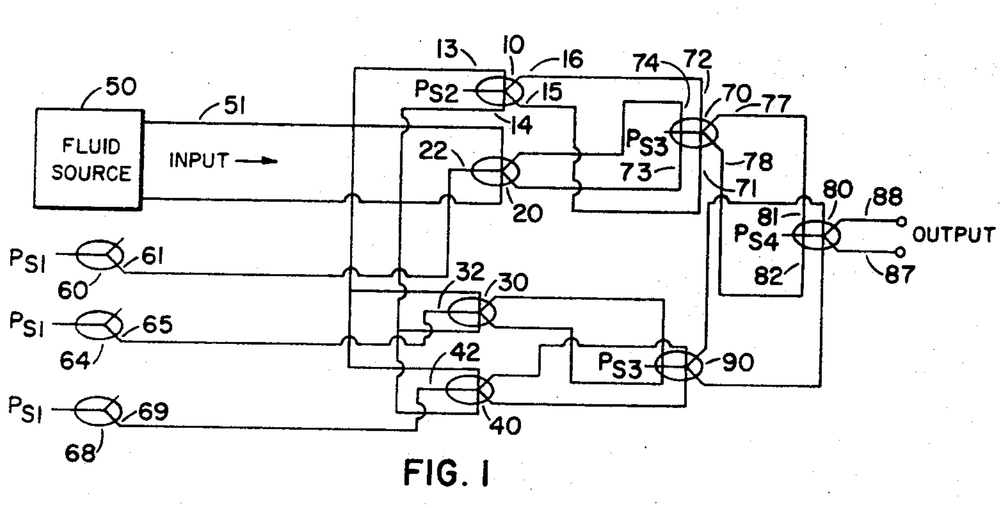
FIG. 1 is a flow diagram of a 4-level fluid gain change circuit.

Referring now to the drawings there is disclosed a preferred embodiment of the present invention in FIG. 1. Fluidic, input amplifiers 10, 20, 30 and 40 have their respective control input ports connected in parallel to receive identical fluidic input signals from an analog fluid supply source 50, thereby dividing the analog fluid supply into equal signal increments. The presence or absence of supply pressure $P_{s1}$ to the power input ports of amplifier 20, 30 and 40 is controlled by respective bi-stable amplifiers 60, 64 and 68. Thus, by applying a control input signal to bi-stable amplifier 60, the flow from $P_{s1}$ can be directed through output port 61 to the power input port 22 of input or incremental amplifier 20. Similarly, flow can separately or simultaneously be coupled through output ports 65 and 69 to respective power inputs 32 and 42 of amplifiers 30 and 40. Amplifier 10 provides the first incremental output and is directly coupled to an input power source $P_{s2}$. For an input signal pressure at control input port 13, there is a corresponding output from port 15. Alternately, pressure or fluid flow through control input port 14 results in an output signal from port 16.

Incremental amplifiers 10 and 20 have their respective outputs coupled in opposition across the control input ports of a fluidic proportional amplifier 70. Amplifier 70 has a constant power source $P_{s3}$ and has a first pair of control inputs 71 and 72 coupled respectively to output ports 15 and 16 of amplifier 10. A second pair of control inputs 73 and 74 are connected to respective output ports of amplifier 20. An output stage proportional amplifier 80 has a first pair of control ports 81 and 82 coupled respectively to output ports 77 and 78 of amplifier 70. A constant power source $P_{s4}$ is coupled to the power input of amplifier 80.

A proportional amplifier 90 is responsive to input amplifiers 30 and 40 in the same manner as amplifier 70 is to input amplifiers 10 and 20. Proportional amplifier 90 is direct coupled to power source $P_{s3}$ and has outputs connected as controlled inputs to output amplifier 80, similarly as amplifier 70 is connected thereto. Output ports 87 and 88 provide a differential output signal therebetween in response to the digital, zero or one increments, outputs of the input amplifier.

Figure 2:
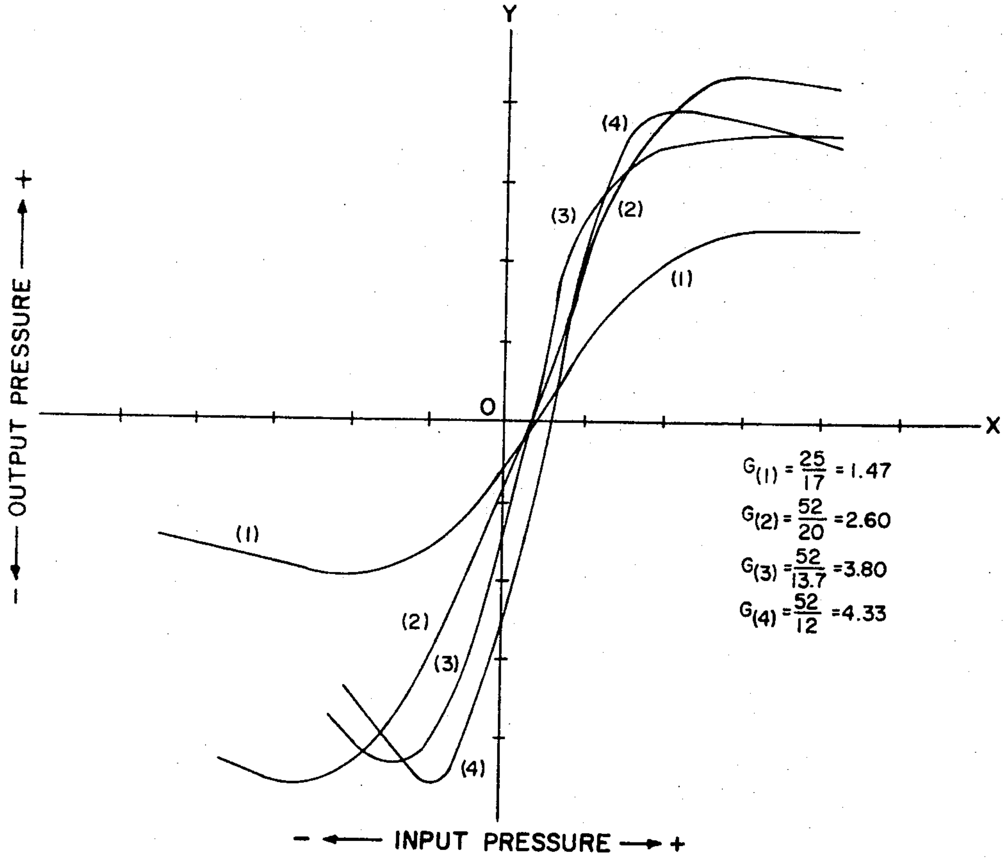
FIG. 2 is an XY plot of input pressure versus output pressure for each of the 4 gain states of FIG. 1.

In FIG. 2 the output pressure is shown versus the input pressure for each of the four gain states. Curve (1) is valid for an output signal with only the first input amplifier 10 providing an output signal. Curve (4) is valid when all incremental amplifiers 10, 20, 30 and 40 are providing an output, digital one, signal. Output gain for each curve is obtained by determining the slope over the linear portion of each curve.

In operation, an input fluidic signal is coupled to control ports of input amplifiers 10, 20, 30 and 40, biasing any flow therethrough to a particular output port. Due to the direct coupling of $P_{s2}$, $P_{s3}$ and $P_{s4}$, amplifiers 10, 70, 90 and 80 are active, with the proportional amplifiers providing a balanced output in the absence of any control signal input. Control parts of bi-stable amplifiers 60, 64 and 68 direct $P_{s1}$ away from respective input amplifiers 20, 30 and 40 so that only one output level is initially provided through amplifier 10. Thus, an increment of the output of source 50 is coupled through a control port of input amplifier 10, through port 15 to control port 71, changing the bias across amplifier 70 outputs and increasing the level in output 77. The signal change in output 77 is coupled to control port 81 and increases the output 87 of amplifier 80 to provide the first step of the output signal. Output signals from any one or all bi-stable amplifiers 60, 64 and 68 can then be gated as desired to increase or decrease the output pressure of the system. Typically, gating of amplifier 60 provides $P_{s1}$ to the power input of amplifier 20. Amplifier 20, being already biased, diverts pressure to control port 73 to enhance the output of proportional amplifier 70, which sequentially steps up the output of amplifier 80.

Similarly, when input power is supplied to input amplifiers 30 and 40, proportional amplifier 90 provides a differential output to further enhance the output of amplifier 80. By providing a gain change signal to the gain change amplifiers 60, 64 and 68, the supply pressure $P_{s1}$ to signal amplifiers are changed changing the circuit gain. The position of the controlling bi-stable amplifier determines the presence or absence of the supply pressure to the incremental stages, thus effecting the gain change of the entire circuit. Obviously more or less than four incremental changes may be obtained by splitting an analog input signal into the desired number of increments and amplifying each increment by a different portion of the circuit. Thus the gain of any increment can be commanded to either zero or one. Summing all increments in the output amplifier yields an output which is a function of the analog input, the increments selected, and the state of each increment. Obviously the power source for input amplifier 10 can also be gated to provide an initially balanced state in the output stage 80. By allowing amplifier 10 to receive its power input through a gain change amplifier the total power input may be constantly supplied or switched, as desired.

Although a particular embodiment and form of this invention has been illustrated, it is obvious to those skilled in the art that modifications may be made without departing from the scope and spirit of the foregoing disclosure. Therefore it is understood that the invention is limited only by the claims appended hereto.

I claim:

1. A fluidic gain change circuit for independently amplifying incremental signals for selective summing to provide a stepped variable output, comprising: a plurality of fluidic input amplifiers for providing a fluidic output, each of said input amplifiers having first and second control ports connected in parallel for receiving identical input signals thereacross, a plurality of fluidic output amplifiers having control ports thereof respectively connected to the output of at least two of said input amplifiers for providing a stepped variable output responsive thereto, and a plurality of gain change amplifiers each having an output port coupled as a power input to respective input amplifiers for changing the state thereof.

2. A fluidic gain change circuit as set forth in claim 1 wherein said plurality of input amplifiers comprise at least two amplifiers, said plurality of output amplifiers is a single proportional amplifier having a differential output and control inputs coupled to outputs of said input amplifiers for providing said stepped output responsive thereto, and said plurality of gain change amplifiers include at least one bi-stable amplifier.

3. A fluidic gain change circuit as set forth in claim 1 wherein said plurality of input amplifiers comprise at least four amplifiers and said plurality of output amplifiers comprise at least two proportional amplifiers, each of said proportional amplifiers being responsive to at least two of said input amplifiers for providing an output signal.

4. A fluidic gain change circuit as set forth in claim 3 and further comprising a fluidic differential amplifier output stage having a constant power source input and at least four control inputs responsive to said proportional amplifier outputs for providing a stepped variable differential output.

5. A fluidic gain change circuit as set forth in claim 4 wherein said plurality of gain change amplifiers are bi-stable amplifiers.

6. In a fluidic gain change circuit having amplifying means and bi-stable fluidic switching means therefor, the method of changing the gain of an analog fluidic input comprising the steps of:

a. splitting the analog input signal into a desired number of increments by paralleling the control input ports of a plurality of amplifiers across the input signal, b. amplifying each increment by individual amplifiers, c. gating each incremental amplifier for obtaining a variable quantity of incremental outputs, and d. summing the selected incremental outputs for providing a proportional output which is a function of the analog input.

* * * * *